(12) United States Patent
Corfield et al.

(10) Patent No.: US 8,737,602 B2
(45) Date of Patent: May 27, 2014

(54) PASSIVE, NON-AMPLIFIED AUDIO SPLITTER FOR USE WITH COMPUTER TELEPHONY INTEGRATION

(71) Applicant: NVOQ Incorporated, Boulder, CO (US)

(72) Inventors: Charles Corfield, Boulder, CO (US); David Mondragon, Lakewood, CO (US); Daniel Morley, Boulder, CO (US)

(73) Assignee: NVOQ Incorporated, Boulder, CO (US)

( * ) Notice: Subject to any disclaimer, the term of this patent is extended or adjusted under 35 U.S.C. 154(b) by 0 days.

(21) Appl. No.: 14/041,628

(22) Filed: Sep. 30, 2013

(65) Prior Publication Data

US 2014/0093061 A1 Apr. 3, 2014

Related U.S. Application Data

(60) Provisional application No. 61/709,064, filed on Oct. 2, 2012.

(51) Int. Cl.
*H04M 1/00* (2006.01)
*H04M 9/00* (2006.01)

(52) U.S. Cl.
USPC .......... 379/421; 379/265.02; 381/10; 381/357

(58) Field of Classification Search
USPC .................. 379/421, 265.02; 381/10, 357
See application file for complete search history.

(56) References Cited

U.S. PATENT DOCUMENTS

| 7,603,273 | B2 | 10/2009 | Poirier | |
|---|---|---|---|---|
| 8,145,381 | B2 * | 3/2012 | Kim et al. | 701/36 |
| 2009/0070108 | A1 | 3/2009 | Yen et al. | |
| 2009/0310799 | A1 * | 12/2009 | Suzuki et al. | 381/98 |

FOREIGN PATENT DOCUMENTS

| JP | 2001-142499 A | 5/2001 |
|---|---|---|
| JP | 2002-366195 A | 12/2002 |
| JP | 2003-202883 A | 7/2003 |

OTHER PUBLICATIONS

International Search Report and Written Opinion of the International Searching Authority of Korea, issued for PCT/US13/62917, mailed Jan. 28, 2014. 14 pages.

* cited by examiner

*Primary Examiner* — Quynh Nguyen
(74) *Attorney, Agent, or Firm* — Perkins Coie LLP

(57) ABSTRACT

A passive, non-amplified audio switch for a computer telephony system is provided. The passive, non-amplified audio switch provides a first telephone jack to receive audio in and send audio out to a first user. The passive, non-amplified audio switch provides a second telephone jack to receive audio in and send audio out to a second user. The passive, non-amplified audio switch further provides audio out and receives audio in from a voice platform, which transcribes audio using a speech to text engine. The passive, non-amplified audio switch provides that audio in from the second user is always provided to the voice platform for transcription.

20 Claims, 3 Drawing Sheets

PASSIVE, NON-AMPLIFIED AUDIO SPLITTER FOR USE WITH COMPUTER TELEPHONY INTEGRATION

CLAIM OF PRIORITY UNDER 35 U.S.C. §119

The present application claims priority to U.S. Provisional Patent Application No. 61/709,064, filed Oct. 2, 2012, the disclosure of which is incorporated herein by reference as if set out in full.

CLAIM OF PRIORITY UNDER 35 U.S.C. §120

None.

REFERENCE TO CO-PENDING APPLICATIONS FOR PATENT

The present Application for Patent is related to U.S. Pat. No. 7,702,093, titled Systems and Methods to Redirect Audio Between Callers and Voice Application, issued Apr. 20, 2010, and U.S. Pat. No. 8,023,635, titled Systems and Methods to Redirect Audio Between Callers and Voice Applications, issued Sep. 20, 2011, both of which are incorporated herein by reference as if set out in full.

BACKGROUND

1. Field

The technology of the present application relates generally to computer telephony integration and inputs to computer application, and more specifically, to using a passive, non-amplified audio splitter such that a customer service representative audio signal is always provided to the return line of the caller and to an input to the speech to text application, which is typically through a processor audio card.

2. Background

Many businesses use customer call centers, whether virtual or brick and mortar, to service their customer base. In these call centers, a customer frequently calls into the center and a customer service representative (CSR) answers the call. The CSR often asks a series of questions and enters the information into a graphical user interface (GUI) located at the CSR's workstation for use by the customer relationship management applications (CRM applications or applications). In many instances, the CRM application will auto populate on receipt of certain customer information.

Data or commands must be entered into the CRM application by the CSR. Manual entry of the data or commands is at best difficult and error prone. Often the CSR must request the customer to repeat information. In other instances, the CSR makes errors when entering the information regardless of whether the customer repeats the information. Generally, the manual entry of the data is error prone and time consuming. Voice automation of the data entry can improve the productivity of data entry to CRM applications by the CSR. Generally, voice automation both speeds up the entry of the data and reduces the errors associated with the data entry. Voice automation improves efficiency because generally it takes less time to speak a command, location, or data value than to enter the same with a keyboard, mouse, touch screen, or the like.

Conventionally, using voice automation requires that an audio stream (sometimes referred to simply as audio) be directed to the speech to text engine such that the speech to text engine can convert the audio stream into text that is returned to the CSR workstation. The returned text may be used at a data or a command prompt. The text is input to the CRM at the appropriate data or command entry field, which may occur by placement of the cursor at the appropriate position such that the return text automatically populates the field or by pasting the data to the field from the copy buffer, or the like. To direct the audio stream, the CSR would activate a toggle or a switch, which may be a unified communications (UC) switch, such that the switch presents the audio stream to either the customer (i.e., caller) or the speech to text engine.

The switching of the audio from one output to another provides numerous drawbacks, however. In some cases, the switch provides delay in either responding to the customer or inputting audio to the speech to text engine. In other cases, the switch degrades the audio signal to the speech to text engine, for one example, by over amplification resulting in clipped or saturated signals. These are but two drawbacks of conventional switches. Additionally, the toggling of phone mute buttons and computer telephone integration switches is itself tiresome and distracting from agents resulting in additional difficulty for CSRs, sometimes generating sufficient difficulty that agents refuse to use voice automation.

Thus, against the above background, improvements are needed to allow implementation of voice automation in customer service applications.

SUMMARY

The foregoing and other features, utilities and advantages of the invention will be apparent from the following more particular description of the technology of the present application as further illustrated in the accompanying drawings.

DETAILED DESCRIPTION

The technology of the present patent application will now be explained with reference to various figures, tables, and the like. While the technology of the present application is described herein with respect to a customer service representative (CSR) operating a customer relationship management (CRM) application while speaking on a telephone with a customer, one of ordinary skill in the art would now recognize that the technology is applicable to other uses for computer telephony integration. For example, the customer service representative may be a doctor and the customer may be a patient where data is input to an electronic health record. In still other examples, the customer service representative may be an accountant, the customer may be a client, and the data may be input to an electronic tax record. While these are but two additional examples, other uses of the technology described herein will now be apparent to those of ordinary skill in the art on reading the application. Additionally, the return text may be used as data to be entered into an application, as generally discussed herein, or as a command for the processor to execute. Moreover, the technology of the present patent application will be described with reference to certain exemplary embodiments herein. The word "exemplary" is used herein to mean "serving as an example, instance, or illustration." Any embodiment described herein as "exemplary" is not necessarily to be construed as preferred or advantageous over other embodiments absent a specific indication that such an embodiment is preferred or advantageous over other embodiments. Moreover, in certain instances, only a single "exemplary" embodiment is provided. A single example is not necessarily to be construed as the only embodiment. The detailed description includes specific details for the purpose of providing a thorough understanding of the technology of the present patent application. However, on reading the disclosure, it will be apparent to those skilled in the art that the technology of the present patent application may be practiced with or without these specific details. In some descriptions herein, generally understood structures and devices may be shown in block diagrams to aid in understanding the technology of the present patent application without obscuring the technology herein. In certain instances and examples herein, the term "coupled" or "in communication with" means connected using either a direct link or indirect data link as is generally understood in the art. Moreover, the connections may be wired or wireless, private or public networks, or the like.

Figure 1:
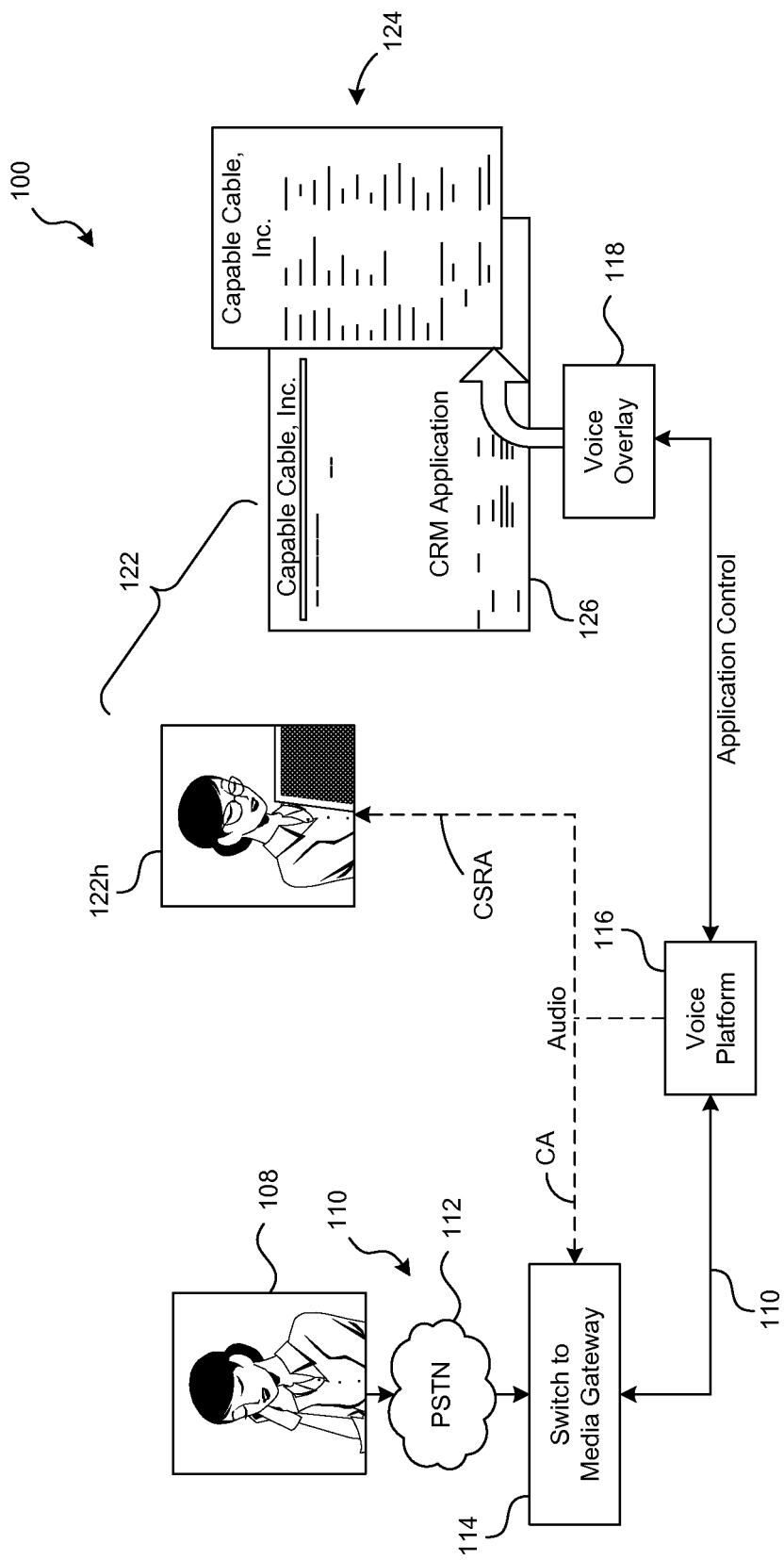
FIG. 1 is a functional block diagram of a call center environment.

Referring first to FIG. 1, a functional block diagram of a call center 100 is provided. While the call center 100 is described in relation to software, one of ordinary skill in the art will now recognize that the call center may be created using non-transitory software components, hardware components, or a combination thereof, or the like. Call center 100 includes, among other things, a connection from the customer 108 to a voice platform 116 via a communication link 110. If customer 108 is using a VoIP compatible connection, communication link 110 may be direct from customer 108 to the voice platform 116 via a network 112. If customer 108 is using a conventional telephone line, the communication link 110 may include a media gateway 114, and network 112 would be a conventional PSTN network. The voice platform 116 connects the voice overlay scripts 118 to the workstation 122. Workstation 122 may be a conventional personal computer or the like with a processor, BIOS, and display system. Voice platform could be, for example, a voice platform using Saylt® as available from nVoq Incorporated located in Boulder, Colo. and the connector could be a vivo connector.

In operation, the customer 108 places a call to the call center 100. A CSR 122h at a workstation 122 receives the call and substantially simultaneously, a screen 124 for the CRM application 126 may display on the workstation 122. The CSR 122h would use a switch, such as the unified communications switch mentioned above, to direct the CSR audio signal CSRA to the voice platform. The voice platform would transcribe the audio signal to text and return the transcribed text to the work station 122.

Figure 2:
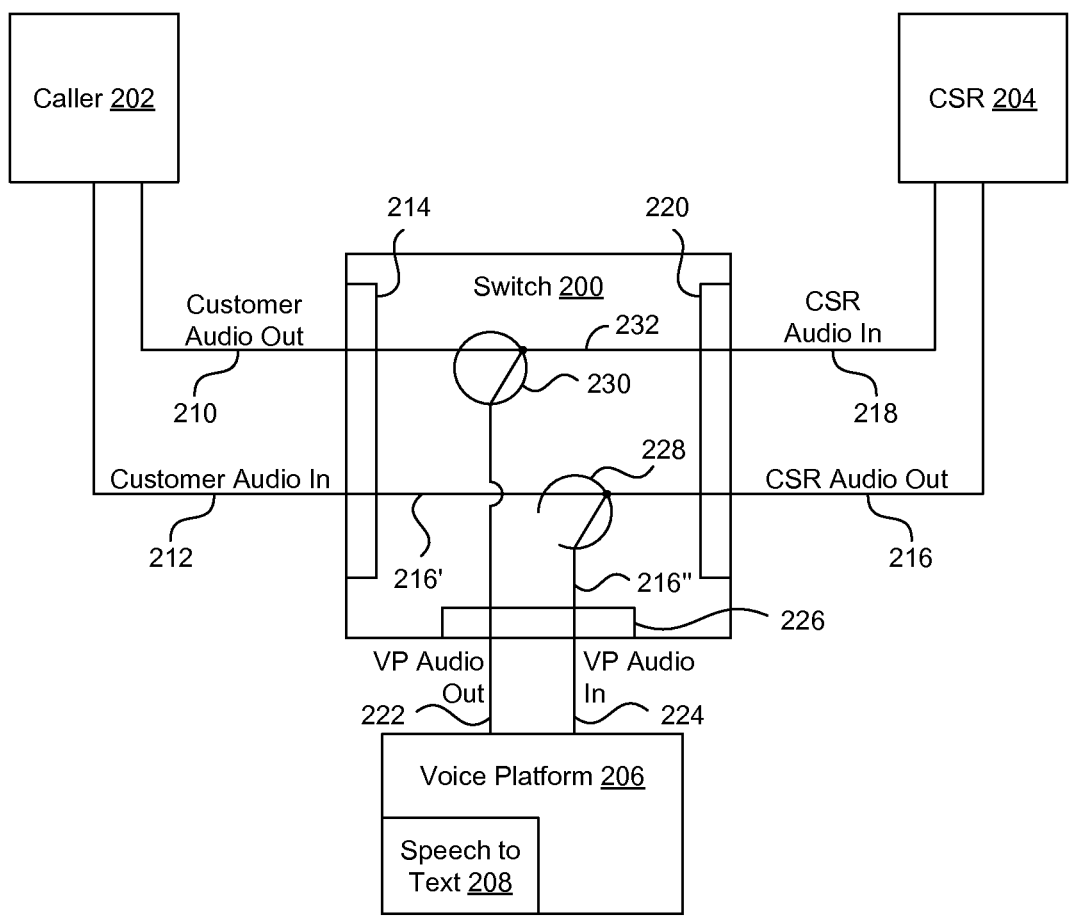
FIG. 2 is a functional block diagram of an audio splitter consistent with the technology of the present application.
Figure 3:
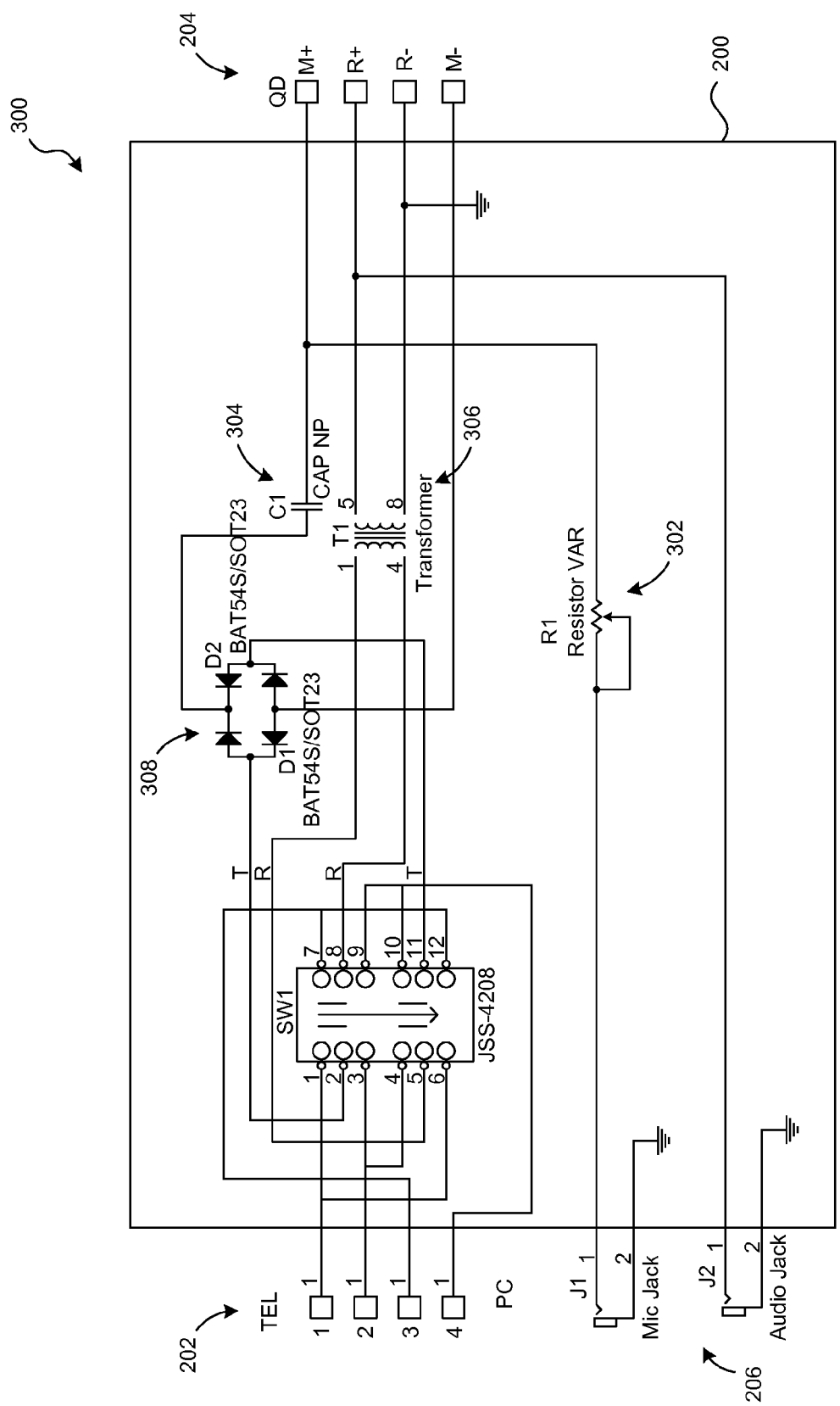
FIG. 3 is a schematic diagram of one possible audio splitter consistent with the technology described in FIG. 2.

As discussed above, however, the conventional switch provides a number of drawbacks to operation of the call center 100. With reference to FIG. 2, a functional block diagram of an audio splitter 200 is provided. The audio splitter 200 is provided between a caller 202 (which may be the customer 108), a CSR 204 (which may be a customer service representative 122h or another provider), and a voice platform 206 (which may be the voice platform 116 whether a local or a remote processor that includes a speech to text engine 208). A schematic diagram 300 for one exemplary audio splitter 200 is shown in FIG. 3. Notice, the caller 202 and CSR 204 are generically referred to, but one of skill in the art will recognize on reading the disclosure that caller 202 or CSR 204 are both shorthand for caller or CSR telephone, headset, or the like. Caller 202 provides a microphone that produces customer audio out signal 210 and a speaker that receives a customer audio in signal 212, both of which are received by a port 214 (or multiple ports 214) or phone jack on switch 200.

Similarly, CSR 204 provides a microphone that produces CSR audio out signal 216 and a speaker that receives a CSR audio in signal 218, both of which are received by a port 220 (or multiple ports 220) or phone jack on switch 200. Voice platform 206 also includes an audio output that produces a VP audio out signal 222 and an audio input that receives a VP audio in signal 224, both of which are received by a port 226, such as a port that may receive a microphone input, audio output cable or the like. The voice platform correspondingly has an audio card, not specifically shown, for receiving audio signals and producing audio signals.

As can be seen, audio splitter 200 includes a signal splitter 228 and a signal joiner 230. The signal splitter 228 functions as a means to split an audio signal. For example, the signal splitter 228 receives the CSR audio out signal 216 (in other words, the spoken audio of the CSR spoken into the CSR 204 microphone) and splits the signal into CSR audio out signal 216' and CSR audio out signal 216". The signal splitter 228 is a passive signal splitter. CSR audio out signal 216' is received by phone jack 216 and becomes the customer audio in signal 212 heard via the speaker of caller 202. CSR audio out signal 216" is received by port 226 and becomes the VP audio in signal 224 received by the voice platform 206, and which is converted to text by speech to text engine 208, and returned to the work station 122. Similarly, the signal joiner 230 is a means for combining audio signals. Signal joiner 230, also passive, receives customer audio out 210 and VP audio out 222 and combines the signals into combined audio signal 232.

Combining the customer audio out signal 210 and the VP audio out signal 222 may cause some interference or difficulty in the audio signals, but it is envisioned that the customer audio out signal 210 and the VP audio out signal 222 will typically not coincide. The voice platform 206 may be provided with a mute module M to inhibit or prevent the voice platform 206 from generating VP audio out signal 222, which mute function may be automatic on receipt of a customer call or may be manually generated at the CSR work station 122. In operation, the mute module M may sense an audio signal when the customer audio out 210 is above a first threshold, such as a noise threshold. When detected, the mute module M may cause an open circuit in the VP audio out 222 signal and/or cause the Voice Platform 216 to cache any outbound audio signals until the customer audio out 210 signal drops below a second threshold, which may be the same or different from the noise threshold above. In any event, the combined audio signal 232 is received by port 220 and becomes the CSR audio in signal 218.

As can be appreciated, the audio splitter 200 has a passive signal splitter 228 and a passive signal joiner 230. In other words, the splitter 200 does not need or require a power supply, AC or DC, to operate and does not cause any gain in the audio signals. Gain is particularly troublesome in the audio signals as the gain may clip or saturate the audio signal. While typically not a problem in person to person communication, clipped or saturated audio signals are problematic for the voice platform 206. In particular, speech to text engine 208 breaks the audio signal into a series of frames having a frequency signal. The recognition portion of the speech to text engine uses the frequency signal and matches the frequency signal to a sound, generally known as a phoneme. Clipped or saturated signals make it difficult for the recognition engine to match the frequency signal as the frequency signal is incorrect. Additionally, any gain in the audio splitter 200 would make it more difficult to configure the voice automation as the microphone to voice platform connection is typically tuned for individual use to provide a high quality audio signal to the voice platform 206. Any additional amplification shrinks the window of operating parameters making tuning the microphone (which may mean proximate location of the microphone to the speakers mouth or the prebuilt amplification of the microphone) more difficult. While amplification is not desired, as shown in FIG. 3, the CSR audio out signal 216" may contain a damp 302 to decrease the signal amplitude. The damp may be, for example, a variable resistor, potentiometer, or the like to reduce the amplitude of the VP audio in signal 224.

As can be appreciated, the voice connection from the caller 202 is never used, and cannot be used, as direct input to the voice platform in the above configuration of the audio splitter. Moreover, the voice connection from the CSR 204 to the caller 202 and the voice platform 206 is always on. The always on connection to the caller 202 and the voice platform 206 allows an agent to, for example, summarize, recap, or conference with the voice platform during the conversation with the customer. The always on, which may be referred to as always open, eliminates agent error that may occur when muting the call as required with conventional devices. The always on features allows the CSR to use the mute function on the phone to block CSR Audio Out 216' signal as part of their daily work routine without losing data input to the processor. For example, if the caller 202 and the CSR 204 discuss an issue and the CSR 204 provides a solution to the caller, the CSR 204 saves time by summarizing the call with the caller 202 while at the same time inputting the summary to the voice platform 206 such that the text generated by the speech to text engine 208 can output text for the CRM application. Moreover, the need to disconnect the CSR audio signal 216" from the voice platform 206 is not necessary as the work station 122 may provide a function key or icon to activate and deactivate the speech to text engine 208. Similarly, should the CSR 204 wish to mute the voice connection to the caller 202, the CSR 204 may use the conventional mute function on the telephone or the like.

Further, the audio connection from the caller 202 and the voice platform 206 is always connected to the CSR 204. This allows the voice platform 206, or the corresponding administrator, to provide input to the CSR 204 agent. The input could be related to initial process set up, optimizing the microphone for input to the voice platform (for example, a request to provide more distance between the speaker's mouth and the microphone may be provided if the signal to the voice platform is being clipped). In some instance, the CSR 204 may request an audio play back or the like. Also, the VP audio out signal may be used in training, such as computer based training, or the like.

Audio splitter 200 also should be provided with electrostatic discharge protection 250. Electrostatic discharge is a surge of electricity between a plurality of objects caused by a short or a dielectric breakdown. The charge may be built up in a number of different manners. Audio splitter 200, as well as other devices, has the potential of developing a static electric charge that, when sufficient, can damage or even destroy the audio card associated with most voice platforms 206. Thus, as shown in FIG. 3, the audio splitter may include, for example, a capacitor 304 or the like as a form of ESD protection. Further isolation may be provided in the lines by providing a transformer 306. The audio splitter may further comprise a half or full wave rectifier such as rectifier 308.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. However, the present application excludes transitory signals.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A passive, non-amplified audio switch for a computer telephony system, comprising:
   a first audio port to receive a first audio signal from and transmit a second audio signal to a first device;

a second audio port to receive a third audio signal from and transmit a fourth audio signal to a second device;

a third audio port to receive a fifth audio signal from and transmit a sixth audio signal to a voice platform such that the sixth audio signal is converted from audio to text by a speech to text engine, a passive, non-amplified audio splitter, wherein the passive, non-amplified audio splitter splits the third audio signal to form the second audio signal and the sixth audio signal; and a passive, non-amplified audio joiner, wherein the first audio signal and the fifth audio signal are joined to form the fourth audio signal.

2. The passive, non-amplified audio switch of claim 1 further comprising an electrostatic discharge protector.

3. The passive, non-amplified audio switch of claim 2 wherein the electrostatic discharge protector comprises a capacitor.

4. The passive, non-amplified audio switch of claim 2 wherein the electrostatic discharge protector comprises a transformer.

5. The passive, non-amplified audio switch of claim 1 wherein the first and second audio ports are telephone jacks.

6. The passive, non-amplified audio switch of claim 1 wherein each of the first, second, and third audio ports comprises a plurality of ports.

7. The passive, non-amplified audio switch of claim 1 further comprising a mute module operatively coupled to mute at least one of the first audio signal or the fifth audio signal.

8. The passive, non-amplified audio switch of claim 7 wherein the mute module mutes the fifth audio signal when the first audio signal is detected.

9. The passive, non-amplified audio switch of claim 7 wherein the mute module mutes the first audio signal when the fifth audio signal is detected.

10. The passive, non-amplified audio switch of claim 1 further comprising a damp operatively coupled to the sixth audio signal.

11. The passive, non-amplified audio switch of claim 10 wherein the damp comprises a variable resistor.

12. A method of splitting an audio signal wherein the split audio signal is configured to be transcribed by a speech to text engine, comprising:

providing a passive, non-amplified audio switch;

receiving at the passive, non-amplified audio switch, first audio in from a first user to be directed to both a second user and a voice platform, wherein the voice platform is further configured to transcribe the audio using the speech to text engine;

splitting by the passive, non-amplified audio switch the first audio in to at least a first audio out and a second audio out; and directing the first audio out to a second user and directing the second audio out to the voice platform.

13. The method of claim 12 comprising damping the second audio out to the voice platform.

14. The method of claim 12 comprising grounding the passive, non-amplified audio switch to inhibit static electrical discharge.

15. The method of claim 12 comprising:

receiving from the second user second audio in and receiving from the voice platform third audio in; and directing the second audio in and third audio in a third audio out.

16. The method of claim 15 further comprising muting at least one of the second audio in or the third audio in.

17. The method of claim 15 further comprising muting the third audio in when receiving the second audio in.

18. A passive, non-amplified audio switch for a computer telephony system, comprising:

a first audio port to receive a first audio signal from and transmit a second audio signal to a first device;

a second audio port to receive a third audio signal from and transmit a fourth audio signal to a second device;

a third audio port to receive a fifth audio signal from and transmit a sixth audio signal to a voice platform such that the sixth audio signal is converted from audio to text by a speech to text engine, non-powered means for splitting the third audio signal to form the second audio signal and the sixth audio signal; and non-powered means for joining the first audio signal and the fifth audio signal to form the fourth audio signal.

19. The passive, non-amplified audio switch of claim 18 further comprising a means for muting at least one of the first audio signal or the fifth audio signal.

20. The passive, non-amplified audio switch of claim 18 further comprising a means for determining the first audio signal is above a noise level and means for muting the fifth audio signal.

* * * * *